(12) United States Patent
Farrand et al.

(10) Patent No.: US 8,901,219 B2
(45) Date of Patent: Dec. 2, 2014

(54) COLOURED POLYMER PARTICLES

(75) Inventors: Louise Diane Farrand, Dorset (GB); Nils Greinert, Seeheim-Jugenheim (DE); Mark John Goulding, Ringwood (GB); Mark James, Romsey (GB); Ashley Nathan Smith, Southampton (GB); Jonathan Henry Wilson, Southampton (GB)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 13/702,167

(22) PCT Filed: May 30, 2011

(86) PCT No.: PCT/EP2011/002666
§ 371 (c)(1), (2), (4) Date: Dec. 5, 2012

(87) PCT Pub. No.: WO2011/154103
PCT Pub. Date: Dec. 15, 2011

(65) Prior Publication Data
US 2013/0075664 A1    Mar. 28, 2013

(30) Foreign Application Priority Data
Jun. 7, 2010 (EP) ................... 100058429

(51) Int. Cl.
| | |
|---|---|
| C08J 3/215 | (2006.01) |
| C08J 3/05 | (2006.01) |
| C08K 11/00 | (2006.01) |
| G02F 1/00 | (2006.01) |
| C08F 2/44 | (2006.01) |
| C08F 2/32 | (2006.01) |
| G02F 1/167 | (2006.01) |
| B82Y 30/00 | (2011.01) |

(52) U.S. Cl.
CPC ........... *C08J 3/05* (2013.01); *G02F 2001/1678* (2013.01); *B82Y 30/00* (2013.01); *C08K 11/00* (2013.01); *Y10S 977/773* (2013.01); *G02F 1/0009* (2013.01); *C08F 2/44* (2013.01); *G02F 1/167* (2013.01); *C08F 2/32* (2013.01)
USPC ........... 524/159; 524/190; 524/431; 359/296; 977/773

(58) Field of Classification Search
CPC ................. C08F 2/22; C08F 2/24; C08F 2/32
USPC ......................... 523/200, 205, 210
See application file for complete search history.

(56) References Cited

U.S. PATENT DOCUMENTS

| | | | |
|---|---|---|---|
| 5,380,362 A | 1/1995 | Schubert | |
| 5,403,518 A | 4/1995 | Schubert | |
| 5,492,646 A * | 2/1996 | Langley et al. | ................ 510/530 |
| 5,582,700 A | 12/1996 | Bryning et al. | |
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2007/0128352 A1 | 6/2007 | Honeyman et al. | |
| 2007/0268244 A1 | 11/2007 | Chopra et al. | |
| 2010/0120948 A1 | 5/2010 | Gane et al. | |

FOREIGN PATENT DOCUMENTS

| | | |
|---|---|---|
| EP | 1491941 A2 | 6/2004 |
| GB | 2438436 A | 11/2007 |
| WO | WO-99/10767 A1 | 3/1999 |
| WO | WO-2005017046 A2 | 2/2005 |
| WO | WO 2008003604 A2 * | 1/2008 |
| WO | WO-2009100803 A2 | 8/2009 |
| WO | PCT/EP2010/000549 | 8/2010 |
| WO | PCT/EP2010/000550 | 8/2010 |
| WO | PCT/EP2010/000551 | 8/2010 |
| WO | PCT/EP2010/000552 | 8/2010 |
| WO | WO-2010089057 A2 | 8/2010 |
| WO | WO-2010089058 A1 | 8/2010 |
| WO | WO-2010089059 A1 | 8/2010 |
| WO | WO-2010089060 A2 | 8/2010 |

OTHER PUBLICATIONS

Sunohara, Seiji, et al., "Investigation of Color Electrophorectic Display Utilizing Electrophoretic Colored Particles", The Imaging Society of Japan, vol. 46, No. 4, (2007), pp. 247-253.
Sunohara, Seiji, et al., "Preparation of Poly-Vinyl Pyrrolidone Fine Particles by Inverse Emulsification-Evaporation Process in Solvent", Kobunshi Ronbunshu, vol. 62, No. 7, (2005), pp. 310-315.
Guthrie, J.T., "Polymeric Colorants", Rev. Prog. Coloration, vol. 20, (1990), pp. 40-52.
International Search Report for PCT/EP2011/002666 mailed Aug. 22, 2011.
U.S. Appl. No. 13/702,185, filed Dec. 5, 2012, Merck Patent GmbH.
International Search Report for PCT/EP2011/002667.

* cited by examiner

*Primary Examiner* — Vu A Nguyen
(74) *Attorney, Agent, or Firm* — Drinker Biddle & Reath LLP

(57) ABSTRACT

This invention relates to coloured polymer particles prepared by a reverse emulsion solvent removal process, electrophoretic fluids comprising such particles, and electrophoretic display devices comprising such fluids.

15 Claims, No Drawings

COLOURED POLYMER PARTICLES

CROSS-REFERENCE TO RELATED APPLICATIONS

This application is a national stage application (under 35 U.S.C. §371) of PCT/EP2011/002666, filed May 30, 2011, which claims benefit of European application 10005842.9, filed Jun. 7, 2010.

This invention relates to coloured polymer particles prepared by a reverse emulsion solvent removal process, electrophoretic fluids comprising such particles, and electrophoretic display devices comprising such fluids.

In recent years a need has developed for low power, low cost and light weight display devices. EPDs (Electrophoretic Displays) can fulfill this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged particles dispersed in a fluid and constrained between two substrates, each comprising one or more electrodes. The space between the electrodes is filled with a dispersion medium which is colourless or a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white or light colour. However, the main disadvantage of state of the art EPDs is the lack of a bright full colour system.

The use of different coloured particles in a single pixel has been exemplified in recent patent literature (U.S. Pat. No. 7,304,634, GB 2 438 436, U.S. 2007/0268244), but all of these approaches require the use of complex cell structures and drive schemes. Two particle systems comprising inorganic and resin particles are also known (EP 1 491 941). These coloured particles are only achievable by complicated processes and/or they are only suitable for specific applications. Particles comprising a polymer and an organic pigment are described in Nippon Gazo Gakkaishi 46(4) 2007, 247-253 and in Kobunshi Ronbunshu, 62(7), 310-315 (July 2005).

There continues to be a demand for improved electrophoretic fluids and a simple preparation of coloured particles which can be easily dispersed in non-polar media. An improved route to provide coloured particles and new electrophoretic fluids has now been found.

The present invention relates to a process for the preparation of coloured polymer particles comprising the steps of a) forming a reverse emulsion comprising optionally at least one polymer, at least one, optionally pre-polymerised, dye, at least one polar solvent, at least one non-polar solvent, and at least one surfactant and b) removing the polar solvent or polar solvents by evaporative methods. The subject matter of this invention relates specifically to coloured polymer particles prepared by such process, and to electrophoretic fluids and displays, for example full colour e-papers, comprising such coloured polymer particles.

Throughout the specification, "reverse emulsion" means that a non-polar solvent (preferably dodecane, or comparable aliphatic hydrocarbons) forms the continuous phase and a polar solvent (preferably water) forms the discontinuous phase (internal phase). Furthermore, the present process is called either "evaporative precipitation" or "reverse emulsion solvent removal" (RESR) due to the steps involved in forming a reverse emulsion and then removing the solvent from the internal phase by evaporative methods to form a solid particle.

The new process to achieving coloured particles is to incorporate a dye into an organic polymer particle. Organic and/or organo-metallic dyes may be used. In this process, by simply changing one dye for another dye, the colour of the particles being prepared can be changed without adversely affecting other particle properties. In this process it is also possible to use a combination of dyes to acquire particles of a desired colour or shade.

The new route provides a simple cost effective process to provide coloured polymer particles suitable for EPD and it is possible to manipulate charge, size, mono-dispersity, steric stability etc. separately in order to produce particles with all the desired features for EPD. Furthermore, the use of largely non-hazardous materials is preferred. Advantageously, commercially available materials can be used and the method does not require any chemical changes. Nevertheless, specially designed polymerisable dyes may be used. One further advantage to this method is that the dye can be chemically bound to the polymer if required. The polymerisable dye can then be polymerised with the polymeric material used as the matrix. In this way the dye is prevented from leaching by being chemically bound. The method developed is a simple process using as few as possible physical processes to yield the final electrophoretic fluid by forming a reverse emulsion and evaporating the internal phase solvent yielding a dispersion of solid particles.

Advantageously, the problem of leaching of dye material from the particle into the dispersion solvent can also be solved by selecting organic or organo-metallic dyes based on their solubility, preferably using charged dyes or highly polar dyes which have extremely low solubility in common dispersion solvents for EPD such as dodecane, hexadecane and Isopar G. The organic or organo-metallic dyes are preferably dispersed within a polymer matrix which further inhibits the transfer into the continuous phase if the dye and the polymer are chosen to have high mutual solubility.

A main advantage of the present process is that the particles are formed directly in a solvent which is highly suitable for an EPD fluid. Therefore, no unwanted solvent contamination occurs in the final formulation. Also transfer to other solvents suitable for EPD is easily possible if required. The present route provides coloured polymer particles with a low average density.

Further advantages of the present invention are that it is possible to have charged particles of appropriate colours e.g. red, green and blue or a combination of cyan, magenta and yellow, and to be able to prepare coloured particles of a desired size and which have a high mono-dispersity, and which incorporate a charge, to enable electrophoretic movement. Access to materials of this type will facilitate the construction of electrophoretic displays utilising the shutter mode, regarded as one of the main contenders for a subtractive mode EPD display.

The charge of coloured polymer particles can be easily controlled by using uncharged or charged materials (positive or negative), e.g. using a dye such as amaranth which has $SO_3^-$ and $Na^+$ groups available to provide charge into a particle. Alternatively, a polymer matrix such as poly(sodium acrylate) can be incorporated to provide charge in the particle.

Alternatively, non-charged polymers and dyes can be utilised and the particles can be charged by using charged surfactants at the formulation stage.

A main advantage of the present process is that the particles are formed directly in a solvent which is highly suitable for an EPD fluid without having to dry particles, and then re-disperse them; in particular expensive freeze drying steps can be avoided. The process also avoids potential irreversible damage to the particle surface brought about by a drying process. The process is even more advantageous in that no solvent transfer step is required to change to the final solvent suitable for use as an electrophoretic fluid. Therefore, no unwanted solvent contamination occurs in the final formulation. Also transfer to other solvents suitable for EPD is easily possible if required.

In addition, the particles may have the following properties: a glassy polymer nature for optical clarity and colour compatibility, a homogeneous crosslinked network structure for solvent resistance, a non-swelling nature when dispersed in EPD solvent media, impact strength, hardness, dispersibility in a non-polar continuous phase that is the most used media for EPD, high electrophoretic mobility in dielectric media, universal applicability for dye incorporation across all colours, accurate zeta potential control, all colours have same density (good for sedimentation/agglomeration performance), excellent switching behaviour, faster response times at comparable voltages. Additionally the low solubility of the materials in the continuous phase also reduces the tendency of the particles to undergo Ostwald ripening processes.

An essential component of the present invention is a dye. Organic as well as organo-metallic dyes are suitable. In general the dyes may be water soluble and they may be anionic, cationic or neutral. Preferably water-soluble dyes are used. The function of the dye is to colour the particle. The dye consists of a chromophore and optional groups to modify physical properties (like solubility, light fastness, etc.) and optionally charged group(s). The dyes are preferably charged or highly hydrophilic to render them insoluble in electrophoretic solvents.

The dye may optionally contain a polymerisable group, e.g. an acrylate or methacrylate group, which can be used for further fixation of the dye to the polymer matrix. Fixation can be done via polymerisation into the matrix pre or post particle formation via homo- or co-polymerization producing random, alternating, blocky, block, multiblock, gradient or other types of polymer architecture.

Also pre-polymerised dyes may be used, e.g. those described in WO 2010/089058. Preferably the water-soluble subspecies of pre-polymerised dyes described in WO 2010/089058 or water-soluble pre-polymerised dyes derived from polymerisable dyes as described in described in the earlier patent applications WO 2010/089057, WO 2010/089059, and WO 2010/089060 may be used.

In another variant of the invention, the dyes are incorporated into the polymer matrix by pre-polymerisation, homopolymerisation or co-polymerisation, of a polymerisable dye. Prior to formation of the coloured polymer particles by RESR, dyes comprising a polymerisable group may be pre-polymerised, e.g. in a standard solution polymerisation and optionally with a suitable comonomer, to produce a polymer for use as the matrix which itself is the chromophore. In this way the chromophore is chemically bound into the particle. Especially when using a dye pre-polymerised with at least one co-monomer, no additional polymer has to be added to form the reverse emulsion in step a). Fixation can be done via polymerisation into the matrix pre or post particle formation via homo- or co-polymerization producing random, alternating, blocky, block, multiblock, gradient or other types of polymer architecture.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups.

Preferred chromophoric groups are azo groups (especially monoazo, and bisazo), anthraquinone and phthalocyanine groups.

The dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Modified dyes (with reactive group(s)) from the application groups of reactive (anionic), direct (anionic), acidic (anionic) and basic (cationic) dyes as designated by the Colour Index (published by The Society of Dyers and Colorists with the American Association of Textile Chemists and Colorists e.g. $3^{rd}$ edition 1982) are preferred.

A review of Polymeric Colourants is given by J. T. Guthrie, Rev. Prog. Coloration, 1990, 20, 40-52.

The dye preferably has a solubility of <1.0 g/l in pure dodecane, more preferably the dye has a solubility of <0.1 g/l in pure dodecane. Most preferable dyes in this work are acid or basic dyes.

Preferable examples of organic dyes are summarised in the following Tables. Dye Examples 1-9 are commercially available from Sigma-Aldrich chemical company.

Examples of water soluble cationic dyes

Counter ion Cl—, Br—, MeOSO3-, acetate, etc.

| 1 | Basic blue 3 | 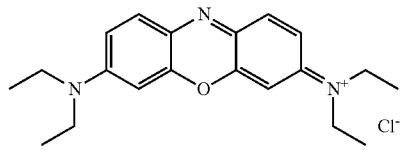 [SMILES: CCN(CC)c1ccc2nc3ccc(=[N+](CC)CC)cc-3oc2c1 ; [Cl-]] |

-continued
| 2 | Basic red 29 | 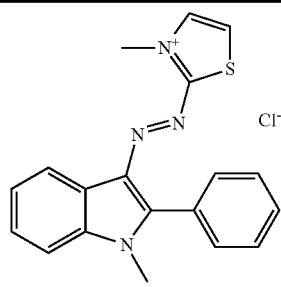 |
| 6 | Amaranth (acid red 27) | 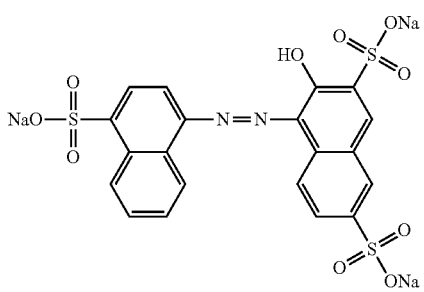 |
| 3 | Basic yellow 11 | 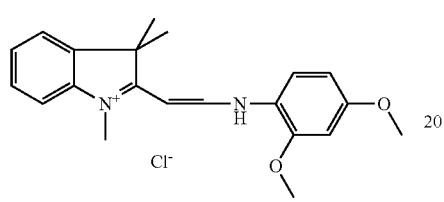 |
| 7 | Acid red 88 | 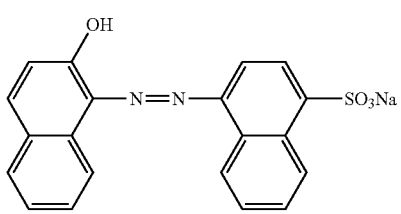 |
| 4 | Brilliant green | 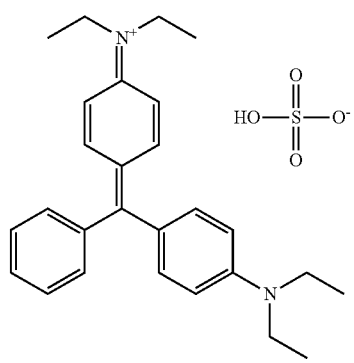 |
| 8 | Ethyl orange sodium salt | 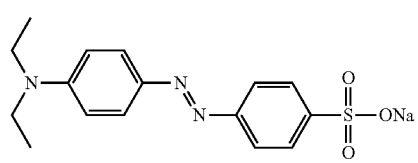 |
Examples of water soluble anionic dyes
Na+, NH4+, NEt4+ etc salts of the acids
| 9 | Eriochrome blue SE | 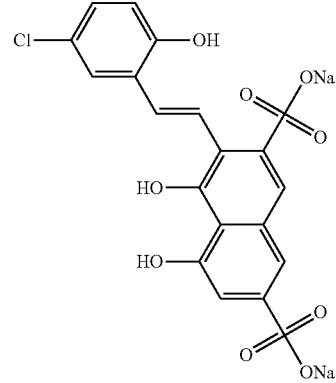 |
| 5 | Acid yellow 9 | 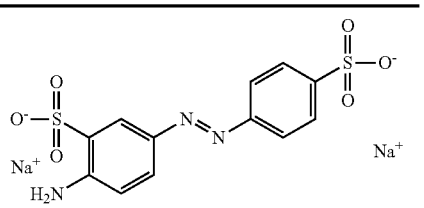 |
Examples of Water Dispersible Neutral Dyes
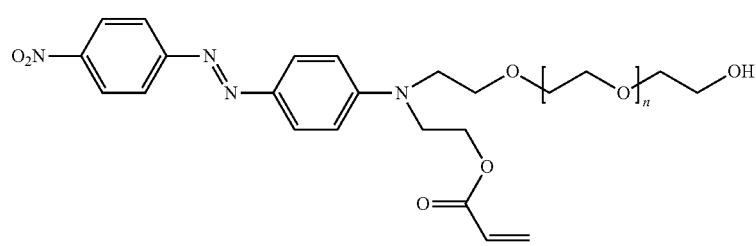

-continued

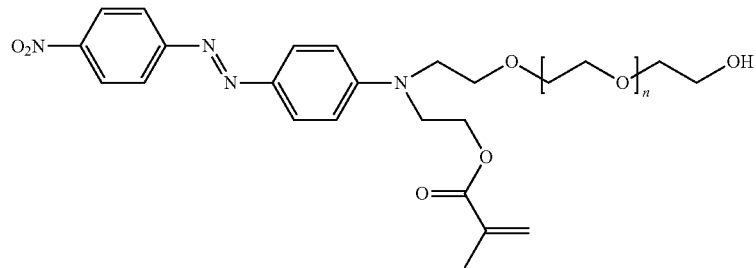

Examples of water soluble polymerisable cationic dyes:
Counter ion Cl—, Br—, MeOSO3-, acetate, etc.

Examples of water soluble polymerisable anionic dyes:
Na+, NH4+,NEt4+etc salts of the acids
CuPc(SO3-)n(SO2NHCH2CH2COOCMe=CH2)m
where CuPc is copper phthalocyanine and m>1,n>1,m+n>2 and <16 and preferably in the range of 2-5.

Basic blue 41 methacrylate

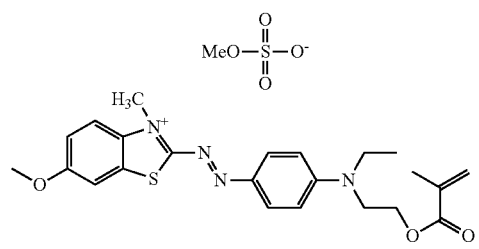 [SMILES: COS(=O)(=O)[O-] ; C=C(C)C(=O)OCCN(CC)c1ccc(/N=N/c2sc3cc(OC)ccc3[n+]2C)cc1]

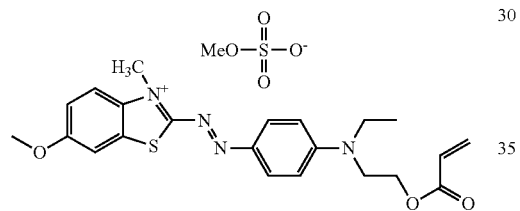

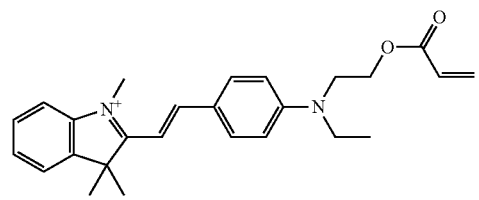 [SMILES: C=CC(=O)OCCN(CC)c1ccc(/C=C/C2=[N+](C)c3ccccc3C2(C)C)cc1]

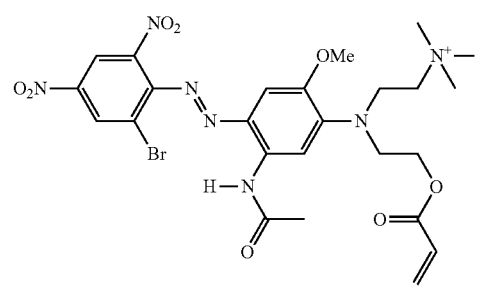 [SMILES: C=CC(=O)OCCN(CC[N+](C)(C)C)c1cc(NC(C)=O)c(/N=N/c2c(Br)cc([N+](=O)[O-])cc2[N+](=O)[O-])cc1OC]

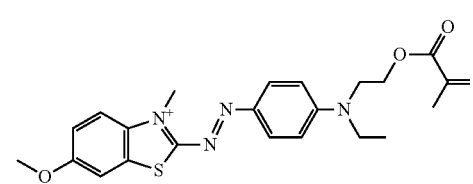 [SMILES: C=C(C)C(=O)OCCN(CC)c1ccc(/N=N/c2sc3cc(OC)ccc3[n+]2C)cc1]

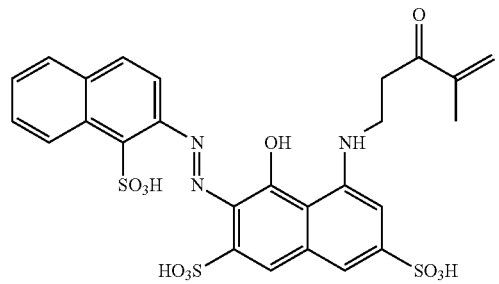 [SMILES: C=C(C)C(=O)CCNc1cc(S(=O)(=O)O)cc2cc(S(=O)(=O)O)c(/N=N/c3ccc4ccccc4c3S(=O)(=O)O)c(O)c12]

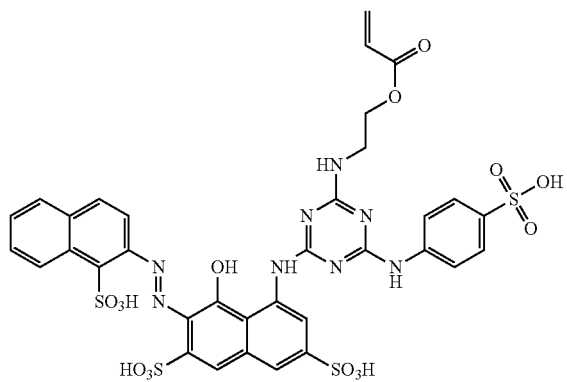 [SMILES: C=CC(=O)OCCNc1nc(Nc2ccc(S(=O)(=O)O)cc2)nc(Nc2cc(S(=O)(=O)O)cc3cc(S(=O)(=O)O)c(/N=N/c4ccc5ccccc5c4S(=O)(=O)O)c(O)c23)n1]

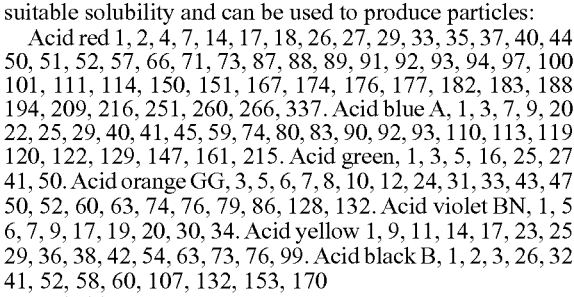

Further dye examples

The following are examples of non-polymerisable dyes which are commercially available from Sigma-Aldrich, have suitable solubility and can be used to produce particles:

Acid red 1, 2, 4, 7, 14, 17, 18, 26, 27, 29, 33, 35, 37, 40, 44, 50, 51, 52, 57, 66, 71, 73, 87, 88, 89, 91, 92, 93, 94, 97, 100, 101, 111, 114, 150, 151, 167, 174, 176, 177, 182, 183, 188, 194, 209, 216, 251, 260, 266, 337. Acid blue A, 1, 3, 7, 9, 20, 22, 25, 29, 40, 41, 45, 59, 74, 80, 83, 90, 92, 93, 110, 113, 119, 120, 122, 129, 147, 161, 215. Acid green, 1, 3, 5, 16, 25, 27, 41, 50. Acid orange GG, 3, 5, 6, 7, 8, 10, 12, 24, 31, 33, 43, 47, 50, 52, 60, 63, 74, 76, 79, 86, 128, 132. Acid violet BN, 1, 5, 6, 7, 9, 17, 19, 20, 30, 34. Acid yellow 1, 9, 11, 14, 17, 23, 25, 29, 36, 38, 42, 54, 63, 73, 76, 99. Acid black B, 1, 2, 3, 26, 32, 41, 52, 58, 60, 107, 132, 153, 170

Basic blue 1, 3, 5, 7, 9, 11, 12, 16, 17, 24, 26, 41, 54, 140. Basic red 1, 2, 5, 9, 15, 22, 29, 48, 60. Basic yellow 1, 2, 3, 9, 11, 15, 31, 40, 45, 53.

Brilliant black BN. Brilliant blue C, G, R. Brilliant green. Brilliant yellow.

Direct blue 1, 6, 10, 14, 15, 39, 43, 50, 71, 72, 98, 130, 189. Direct black, 19, 36, 38, 56. Direct red 2, 4, 7, 13, 15, 23, 24, 26, 28, 37, 53, 75, 80, 81.

Direct violet 17, 38, 51, 75. Direct yellow 4, 6, 7, 8, 9, 11, 12, 20, 27, 50, 59, 96, 105, 127.

Fast black K. Fast blue B, BB, RR. Fast green FCF. Fast red B, ITR, KL, RC, TR.

Mordant blue, 1, 9, 10, 13, 14, 29, 79. Mordant red 5, 7, 11, 19. Mordant yellow 1, 3R, 7, 10, 12.Mordant orange 1. Mordant brown 1. Mordant violet 5. Mordant black 3, 11, 13, 17, 25.

Reactive black 5, 1, 13, 23. Reactive blue 2, 4, 5, 15, 72, 114, 160. Reactive brown 2, 7, 10.Reactive green 5, 19.Reactive orange 13, 16.Reactive red 2, 3, 4, 23, 29, 35, 120.Reactive yellow 2, 3, 13, 15, 42, 18, 86.

Solvent blue 37

When polymerisable dyes are used, the water-soluble subspecies of polymerisable dyes described in the earlier patent applications WO 2010/089057,WO 2010/089059,and WO 2010/089060 are advantageously suitable for the present invention.

In a variant of the present invention, the reverse emulsion additionally comprises a reflective particle, preferably a white reflective particle. Preferably, white reflective particles are used having a refractive index of ≥1.8,especially ≥2.0,are used. Especially titanium dioxide, zinc oxide, alumina, barium sulphate and/or tin dioxide, especially titanium dioxide and/or zinc dioxide, can be used, preferably titanium dioxide or zinc oxide. Titanium dioxide is especially preferred.

The new particles can be prepared from many polymer types. Preferably, the polymer is produced from a monomer which is insoluble in non-polar solvents such as dodecane or the monomer is soluble but the polymer insoluble in non-polar solvents such as dodecane. Polymers which are particularly suitable are those which are highly hydrophilic or are charged to render themselves hydrophilic, especially preferred are for example poly(vinyl pyrrolidone), poly(acrylamide), poly(acrylic acid) and poly(methacrylic acid).

Further suitable and commercially available polymers are: Poly(2-acrylamido-2-methyl-1-propanesulfonic acid), Poly (2-acrylamido-2-methyl-1-propanesulfonic acid-co-acrylonitrile) acrylonitrile, Poly(N-isopropylacrylamide), Poly (acrylamide-co-acrylic acid), Poly(acrylamide-co-acrylic acid) partial sodium salt, Poly(acrylamide-co-acrylic acid) potassium salt, Polyacrylamide, Poly(acrylic acid sodium salt), Poly(acrylic acid), Poly(acrylic acid) partial potassium salt, Poly(acrylic acid) partial sodium salt, Poly(acrylic acid), partial sodium salt-graft-poly(ethylene oxide), Poly(acrylic acid-co-maleic acid) sodium salt, Poly(ethylene-alt-maleic anhydride), Poly(isobutylene-co-maleic acid) sodium salt, Poly(methyl vinyl ether-alt-maleic acid monobutyl ester), Poly(methyl vinyl ether-alt-maleic acid), Poly(methyl vinyl ether-alt-maleic anhydride), Poly(styrene-a/t-maleic acid), Poly(1-vinylpyrrolidone-co-2-dimethylaminoethyl methacrylate), Poly(2-dimethylamino)ethyl methacrylate) methyl chloride quaternary salt, Poly(2-ethylacrylic acid), Poly(2-hydroxyethyl methacrylate), Poly(2-hydroxypropyl methacrylate), Poly(2-propylacrylic acid), Poly(methacrylic acid, sodium salt), Poly[(2-ethyldimethylammonioethyl methacrylate ethyl sulfate)-co-(1-vinylpyrrolidone)], Poly[ethyl acrylate-co-methacrylic acid-co-3-(1-isocyanato-1-methylethyl)-α-methylstyrene], adduct with ethoxylated nonylphenol, Cucurbit[5]uril, Cucurbit[7]uril, Cucurbit[8]uril, Ethylenimine, oligomer, Poly(2-ethyl-2-oxazoline), Poly(2-isopropenyl-2-oxazoline-co-methyl methacrylate), Poly (acrylamide-co-diallyldimethylammonium chloride), Poly (allylamine hydrochloride), Poly(allylamine), Poly (diallyldimethylammonium chloride), Poly(dimethylamine-co-epichlorohydrin-co-ethylenediamine), Poly (ethyleneimine), Poly[bis(2-chloroethyl)ether-alt-1,3-bis[3-(dimethylamino)propyl]urea] quaternized, Polyethylenimine, 80% ethoxylated, Polyethylenimine, branched, 2-Dodecenylsuccinic polyglyceride, Glycerol propoxylate average, Poly(methyl vinyl ether), Polyepoxysuccinic acid, Poly(4-styrenesulfonic acid) ammonium salt, Poly (4-styrenesulfonic acid) lithium salt, Poly(4-styrenesulfonic acid), Poly(4-styrenesulfonic acid-co-maleic acid) sodium salt, Poly(anetholesulfonic acid, sodium salt), Poly(sodium 4-styrenesulfonate), Poly(vinyl acetate-co-crotonic acid), Poly(vinyl sulfate) potassium salt, Poly(vinylphosphonic acid), Poly(vinylsulfonic acid, sodium salt), Mowiol, Poly (vinyl alcohol), Poly(vinyl alcohol-co-ethylene).

Most preferred are poly(acrylamide), poly(1-vinylpyrrolidone-co-2-dimethylaminoethyl methacrylate), and poly (acrylic acid) and poly(methacrylic acid) or their corresponding alkali salts.

Charging the polymer can also be facilitated by using during polymer preparation an initiator which is charged leaving that charge residing as an end-group on the polymer. Such examples are 2,2'-azobis(2-methylpropionamidine)dihydrochloride (V-50) (Wako Chemicals), potassium peroxodisulfate (KPS), ammonium peroxodisulfate (APS), sodium peroxodisulfate (SPS), 2,2'-azobiscyanovaleric acid (ACVA) (Wako Chemicals), 2,2'-azobis[2-(2-imidazolin-2-yl)propane]dihydrochloride (VA044) (Wako Chemicals).

However, charging does not have to come from the initiator fragment so initiators which can also be used are those such as 2,2'-azobis(isobutyronitrile) (AIBN) (VVako Chemicals), 2,2'-azobis(2-methylbutyronitrile) (Vazo 67) (Wako Chemicals) and benzoyl peroxide.

Further essential components of the present process are surfactants, generally having a hydrophilic head group and a hydrophobic tail. Preferable examples are those with a hydrophilic-lipophilic balance HLB (as described in "Introduction to Surface and Colloid Chemistry" (Ed. D J Shaw, Pub. Butterworth Heinemann)) less than 10,preferably between 2 and 8 and more preferably 3 and 6.HLB of a surfactant is a measure of the degree to which the surfactant is hydrophilic or lipophilic, determined by calculating values for the different regions of the molecule. The head group may be a salt to allow charging or can also consist of an amine or acid moiety which can also, but does not have to, charge the particle.

The role of the surfactant is to stabilize the reverse emulsion when it is formed and then to stabilize the solid particles after solvent removal. The surfactant can also be used to charge the particles, allowing them to switch electrophoretically. This may be achieved by using a blend of surfactants or one single surfactant.

Preferable surfactant additives have some form of block, branched, graft or comb-like structure to maximize physical or chemical adsorption onto the surface of the particles. Long or branched hydrophobic tails are preferable to maximize the steric stabilization of the surfactant. Especially suitable are succinimide based surfactants, and alkyl sulfosuccinates.

Typical surfactants (either by steric stabilisation or by use as a charging agent) are known to experts in the field and include (but are not limited to) the Brij, Span and Tween series of surfactants (Aldrich) Infineum surfactants (Infineum), the Solsperse, Ircosperse and Colorburst series (Lubrizol), the OLOA charging agents (Chevron Chemicals) and Aerosol-OT (A-OT) (Aldrich). Preferable surfactant additives in this work are Solsperse range and A-OT, and even more preferably Solsperse 17,000 and A-OT.

Solvents for the two phases of the reverse emulsion are preferably chosen to be as immiscible as possible whilst being good solvents for the components.

The continuous phase (preferably dodecane) is required to be a good solvent for the surfactants being used and the discontinuous phase must be a good solvent for the pigment and polymer matrix material used (preferably water).

The continuous phase solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the polymer used in step a). Adjustment of these variables can be useful in order to change the behaviour of the final application. Preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. Preferably dodecane, tetradecane, decane, nonane, and mixtures thereof are used. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents. Especially preferred is dodecane.

The discontinuous phase solvent is chosen primarily on the solubility of the dye and polymer matrix components, its boiling point relative to that of the continuous phase and its solubility in the continuous phase. Those solvents particularly suitable are water, low molecular weight alcohols and some of the more hydrophilic solvents from ketones, aldehydes, ethers and esters.

Further suitable solvents could also include highly polar solvents such as acetonitrile, DMSO (dimethyl sulfoxide) and DMF (dimethylformamide). Preferably water, low molecular weight alcohols, acetonitrile, DMSO, DMF or mixtures thereof, preferably water and/or ethanol, are used. The most preferred solvent is water.

The solvent selected must have a boiling point lower than that of the continuous phase to allow its removal and it is also important to consider any azeotropes which may form restricting removal of the discontinuous phase solvent. Solvents which are particularly suitable for these 2 emulsion phases are a dodecane continuous phase and a water or ethanol discontinuous phase.

The present process comprises the steps of a) forming a reverse emulsion comprising optionally at least one polymer, at least one, optionally pre-polymerised, organic dye, at least one polar solvent, at least one non-polar solvent, and at least one optionally charged surfactant, b) removing the polar solvent or polar solvents by evaporative methods and c) optionally removing the non-polar solvent or non-polar solvents. It is especially advantageous that step c) can be omitted if the continuous phase consists of the solvent intended for use in the electrophoretic solvent.

The reverse emulsion of step a) is prepared by a1) forming a polar phase by mixing optionally at least one polymer, at least one, optionally pre-polymerised, organic dye, and at least one polar solvent, a2) forming a non-polar phase by mixing at least one non-polar solvent, and at least one surfactant, a3) combining the polar phase and the non-polar phase, and a4) homogenising the combined phases to form the reverse emulsion.

It is most preferred that in step a1) the following components are used 1) a water-soluble or water-dispersible, prefearbly polymerisable, dye, 2) a polymer selected from poly(1-vinylpyrrolidone-co-2-dimethylaminoethyl methacrylate), poly(acrylamide), and poly(acrylic acid) and poly(methacrylic acid) or their corresponding alkali salts, and 3) water, and that a surfactant and dodecane are used in step a2). Preferably, amaranth, basic blue 41 methacrylate, and acid yellow 9 are used.

The reverse emulsion is preferably formed using some form of shear. This shear may be in the form of high shear homogenisation by for example a Silverson homogeniser or sonication by for example a Branson Sonifer. It is often advantageous to form a reverse pre-emulsion using low shear and then higher shear to form the desired particle size. The shear is preferably applied once the non-polar continuous phase and polar discontinuous phase have been formed, separately mixed until homogeneous and then combined to form a 2-phase system. Additionally, shear may be advantageous to form the aqueous phase which can be done using high shear homogenisation or sonication.

In another preferred variant of the invention, the particles can be cross-linked in this method by inclusion of reactive side groups in the components which comprise the particle. Cross-linking can be facilitated for example by post particle formation polymerisation initiated by UV or heat, or by reaction of side groups driven by removal of the polar solvent. These reactions preferably need no further synthetic step than those already used to remove the solvent and form particles, being preferably driven by heating, UV or removal of water. These reactions can include for example polymerisation of pendant double bonds by inclusion of a thermal or UV initiator, or cross condensation or side groups, driven by removal of water.

If polymerisable dyes are used in the RESR process, they can be polymerised with the polymeric material used as the matrix by addition of co-monomers and a thermal initiator. In this way the dye is additionally prevented from leaching by being chemically bound. This polymerisation can be done during or after particle formation by RESR.

The present coloured polymer particles are preferably spherical particles with a size (diameter) in the range of 50-1000 nm and preferably with a monodisperse size distribution. Preferred particle sizes are 50-600 nm, preferably 50-560 nm, especially 50-500 nm, even more preferred 100-400 nm. Especially preferred are particles having a particle size of 150-400 nm, especially 150-350 nm. Particle sizes are determined by photon correlation spectroscopy of aqueous particle dispersions by a common apparatus such as a Malvern NanoZS particle analyser.

The size of polymer particles in electrophoretic fluids may be different from sizes measured in aqueous dispersions because of the influence of solvents and/or surfactants. In electrophoretic fluids, the polymer particles of the invention preferably have a particle size of 100-800 nm, especially 100-700 nm, preferably 150-700 nm are preferred. Especially preferred are polymer particles having a particle size of 150-600 nm.

Particles of the invention are primarily designed for use in electrophoretic displays, especially for use in mono, bi or polychromal electrophoretic devices. A typical electrophoretic display preferably consists of the particles dispersed in a low polar or non-polar solvent along with additives to improve electrophoretic properties, such as stability and charge. Examples of such dispersions are well described in the literature, for example U.S. Pat. No. 7,247,379; WO 99/10767; U.S. 2007/0128352; U.S. Pat. Nos. 7,236,290; 7,170,670; 7,038,655 ; 7,277,218; 7,226,550; 7,110,162; 6,956,690; 7,052,766; 6,194,488; 5,783,614; 5,403,518; 5,380,362.

Typical additives to improve the stability of the fluid (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5cst), low water solubility, a high boiling point (>80° C.) and a refractive index and density similar to that of the particles. Adjustment of these variables can be useful in order to change the behaviour of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), Infineum surfactants (Infineum), and dodecane (Sigma Aldrich).

Usually electrophoretic fluids comprise a charged inorganic nanoparticle such as titania, alumina or barium sulphate, coated with a surface layer to promote good dispersibility in dielectric media and a dielectric fluid media. White reflective polymer particles, optionally cross-linked, made by a reverse emulsion solvent removal process comprising the steps of a) forming a reverse emulsion comprising at least one polymer, at least one white reflective particle, preferably titanium dioxide or zinc oxide, at least one polar solvent, at least one non-polar solvent, and at least one optionally charged surfactant, b) removing the polar solvent or polar solvents by evaporative methods and c) optionally removing the non-polar solvent or non-polar solvents, may preferably be used. The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046 The Electrophoretic fluid is then incorporated into an Electrophoretic display element by a variety of pixel architectures, such as can be found in C. M. Lampert, Displays; 2004, 25(5) published by Elsevier B. V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B. V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are thus expressly also part of the disclosure content of the present application. The following examples explain the present invention in greater detail without restricting the scope of protection.

EXAMPLES

All solvents except water are purchased from VWR at the highest grade possible and are used without further purification. The water used is de-ionised. Polyvinylpyrrolidone (PVP, Mw 55,000), poly(acrylic acid) (Mw 100,000, 35% in water), poly(sodium acrylate) (Mw 15,000, 35% in water), polyacrylamide (Mw 10,000, 50% in water), 2,2'-(ethylenedioxy)bis(ethylamine) (98%), 1-[3-(dimethylamino)propyl]-3-ethylcarbodiimide methiodide, vinylbenzyl chloride (97%), 2,2'-azobis(2-methylpropionamidine)dihydrochloride (AIBA) (97%), poly(1-vinylpyrrolidone-co-dimethylaminoethyl methacrylate) (Mw 1,000,000, 19% in water), amaranth (90%) and acid yellow 9 (95%) are purchased from Sigma-Aldrich and are used without further purification. Solsperse 17,000 is provided by Lubrizol and is used without further purification.

The characterisation of the formulations was performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1

Preparation of a Dispersion of Amaranth-PVP Nanoparticles

An aqueous phase is formed by combining water (20 g), amaranth (125 mg) and PVP (625 mg). This dispersion is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion. On completion, the product is obtained as a suspension of deep red particles of amaranth in a matrix of PVP, stabilised by Solsperse 17,000 and dispersed in dodecane. Particle size measured by light scattering on a Malvern Zetasizer Nano ZS is determined to be 206 nm with a size polydispersity index of 0.194.

Example 2

Preparation of a Dispersion of Amaranth-poly(sodium acrylate) Nanoparticles

An aqueous phase is formed by combining water (20 g), amaranth (125 mg) and poly(sodium acrylate) (625 mg). This dispersion is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion. On completion, the product is obtained as a suspension of deep red particles of amaranth in a matrix of poly(sodium acrylate), stabilised by Solsperse 17,000 and dispersed in dodecane. Particle size measured by light scattering on a Malvern Zetasizer Nano ZS is determined tote 196 nm with a size polydispersity index of 0.174.

Example 3

Preparation of a Dispersion of Amaranth-polyacrylamide Nanoparticles

An aqueous phase is formed by combining water (20 g), amaranth (125 mg) and polyacrylamide (625 mg). This dispersion is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion. On completion, the product is obtained as a suspension of deep red particles of amaranth in a matrix of polyacrylamide, stabilised by Solsperse 17,000 and dispersed in dodecane. Particle size measured by light scattering on a Malvern Zetasizer Nano ZS is determined to be 178 nm with a size polydispersity index of 0.126.

Example 4

Preparation of a Dispersion of Acid Yellow 9-PVP Nanoparticles

An aqueous phase is formed by combining water (20 g), acid yellow 9 (125 mg) and PVP (625 mg). This dispersion is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion. On completion, the product is obtained as a suspension of yellow particles of acid yellow 9 in a matrix of PVP, stabilised by Solsperse 17,000 and dispersed in dodecane. Particle size measured by light scattering on a Malvern Zetasizer Nano ZS is determined to be 193 nm with a size polydispersity index of 0.135.

Example 5

Preparation of a Dispersion of Pre-polymerised Basic Blue 41 methacrylate-Nanoparticles a) Acrylamide (98 g), basic blue 41 methacrylate (2 g) and water (350 g) are combined in a round bottomed flask and stirred until homogeneous. The dispersion is degassed under nitrogen with stirring from an overhead stirrer at 300 rpm. The solution is heated to 70° C. and held for 10 minutes at temperature to equilibrate. AIBA (2.0 g) is dissolved in water (50 ml) and is added to the reaction to start polymerisation. The reaction is held at 70° C. for 5 hours after which point it is cooled to room temperature yielding a solution of coloured polymer 1.

b) An aqueous phase is formed by combining water (20 g) and polymer 1 (625 mg). This solution is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. The reverse pre-emulsion is then submitted to high shear homogenisation by a Branson Sonifier 450 using a horn probe at 40% strength for 5 minutes to form the final reverse emulsion. The reverse emulsion is then transferred to a Florentine flask and placed on a rotary evaporator to remove water from the discontinuous phase of the reverse emulsion. On completion, the product is obtained as a suspension of deep blue particles of acrylamide copolymer stabilised by Solsperse 17,000 and dispersed in dodecane.

Example 6

Preparation of a Dispersion of Pre-polymerised Basic Blue 41 methacrylate-TiPure R900-Nanoparticles An aqueous phase is formed by combining water (17.6 g), TiPure R900 (1.0 g) and coloured polymer 1 prepared according to Example 5a (4.8 g). This dispersion is stirred until homogeneous and is then submitted to high shear homogenisation by a Branson Sonifer 450 using a horn probe at 40% strength for 5 minutes.

In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm.

The aqueous phase is then added dropwise to the oil phase over 1 minute, and stirring is maintained for 4 further minutes. The reverse pre-emulsion is then submitted to high shear homogenisation by a Branson Sonifer 450 using a horn probe at 40% strength for 5 minutes to form the final reverse emulsion. The reverse emulsion is then transferred to a Florentine flask and placed on a rotary evaporator to remove water from the discontinuous phase of the reverse emulsion. On completion, the product is obtained as a suspension of blue transflective particles of TiPure R900 in a matrix of blue polyacrylamide copolymer, stabilised by Solsperse 17,000 and dispersed in dodecane.

Example 7

Preparation of a Dispersion of Amaranth-Crosslinked Polyacrylic Acid Nanoparticles An aqueous phase is formed by combining water (20 g), amaranth (125 mg) and poly(acrylic acid) (5 g), 1-[3-(dimethylamino)propyl]-3-ethylcarbodiimide methiodide (1 g). This dispersion is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. After this time, stirring is maintained and 2,2'-(ethylenedioxy)bis(ethylamine) (0.25 g) is dripped into the solution. The reverse pre-emulsion is then submitted to high shear homogenisation by a Branson Sonifer 450 using a horn probe at 40% strength for 5 minutes to form the final reverse emulsion. The reverse emulsionis then transferred to a Florentine flask and placed on a rotary evaporator to remove water from the discontinuous phase of the reverse emulsion. On completion, the product is obtained as a suspension of deep red particles of amaranth in a matrix of crosslinked polyacrylic acid, stabilised by Solsperse 17,000 and dispersed in dodecane.

Example 8

Preparation of a Dispersion of Amaranth-Crosslinked Polyvinyl pyrrolidone-co-dimethylaminoethyl Methacrylate Nanoparticles An aqueous phase is formed by combining water (20 g), amaranth (125 mg) and poly1-vinylpyrrolidone-co-dimethylaminoethyl methacrylate) (5 g), vinylbenzylchloride (1 g) and AIBA (20mg). This dispersion is stirred until homogeneous. In a separate flask an oil phase is formed by combining Solsperse 17000 (2.4 g) and dodecane (80 g). This solution is stirred until homogeneous. An IKA high shear homogeniser is submerged in the oil phase and stirring is started at 20,000 rpm. The aqueous phase is then added dropwise over 1 minute, and then stirring is maintained for 4 further minutes. The reverse pre-emulsion is then submitted to high shear homogenisation by a Branson Sonifier 450 using a horn probe at 40 strength for 5 minutes to form the final reverse emulsion. The reverse emulsionis then transferred to a Florentine flask and placed on a rotary evaporator at 70 C to remove water from the discontinuous phase of the reverse emulsion and initiate polymerisation. On completion, the product is obtained as a suspension of deep red particles of amaranth in a matrix of crosslinked polyvinylpyrrolidone-co-dimethylaminoethyl methacrylate quaternised with vinylbenzyl chloride, stabilised by Solsperse 17,000 and dispersed in dodecane.

Example 9

Electrophoretic Formulation Containing a Dispersion of Amaranth-PVP Nanoparticles (Example 1)

0.0102 g of Aerosol-OT (Sigma-Aldrich) in 0.5777 g of dodecane (Sigma-Aldrich) is added to 0.4271 g of a 7.019% dispersion of particles in dodecane and vortex mixed. The dispersion is then filtered thru 1 micron cloth to yield a magenta electrophoretic ink.

Size (348.6 nm), Electrophoretic Mobility (0.03538 pmcmNs), ZP (+38.2 mV).

Example 10

Electrophoretic Formulation Containing a Dispersion of Amaranth-PVP Nanoparticles (Example 1)

0.0104 g of Aerosol-OT (Sigma-Aldrich) is added to 1.998 g of a dispersion of particles in dodecane (Sigma-Aldrich) and vortex mixed. The dispersion is then filtered thru 1 micron cloth to yield a magenta electrophoretic ink. Size (178.6 nm), Electrophoretic Mobility (0.02273 pmcm/Vs), ZP (+24.5 mV).

The invention claimed is:

1. A process for the preparation of coloured polymer particles for use in electrophoretic devices, comprising the steps of
   a) forming a reverse emulsion comprising
      1) at least one polymer, at least one, dye, at least one polar solvent, at least one non-polar solvent, and at least one optionally charged surfactant, or
      2) at least one pre-polymerized dye at least one polar solvent, at least one non-polar solvent, and at least one optionally charged surfactant,
   b) removing the polar solvent or polar solvents by evaporative methods and
   c) optionally removing the non-polar solvent or non-polar solvents,
   wherein the non-polar solvent used in step a) is dodecane, tetradecane, decane, nonane, or mixtures thereof.

2. The process according to claim 1, wherein the reverse emulsion of step a) is prepared by a1) forming a polar phase by mixing at least one polar solvent with at least one pre-polymerized dye or with a combination of a dye and at least one polymer, a2)forming a non-polar phase by mixing at least one non-polar solvent, and at least one surfactant, a3) combining the polar phase and the non-polar phase, and a4) homogenising the combined phases to form the reverse emulsion.

3. The process according to claim 1, wherein the dye is water-soluble or water-dispersible.

4. The process according to claim 1, wherein the dye comprises a chromophoric group and optional groups to modify physical properties and/or optionally charged groups and/or optionally linker groups and/or optionally polymerisable groups.

5. The process according to claim 1, wherein amaranth, basic blue 41 methacrylate, and/or acid yellow 9 are used as dyes.

6. The process according to claim 1, wherein the polymer of step a) is hydrophilic and/or charged.

7. The process according to claim 1, wherein the polar solvent used in step a) is water, low molecular weight alcohol, acetonitrile, DMSO, DMF or mixtures thereof.

8. The process according to claim 1, wherein the polar solvent used in step a) is water and/or ethanol.

9. The process according to claim 1, wherein the non-polar solvent used in step a) has a refractive index and a density similar to that of the polymer used in step a).

10. The process according to claim 9, wherein the non-polar solvent used in step a) is dodecane.

11. The process according to claim 1, wherein a pre-polymerised dye, optionally co-polymerised dye, is used.

12. The process according to claim 1, wherein the reverse emulsion additionally comprises a reflective particle.

13. The process according to claim 1, wherein the reverse emulsion additionally comprises titanium dioxide.

14. The process according to claim 1, wherein the coloured polymer particles are cross-linked during or post particle formation according to steps a) to c).

15. The process as claimed in claim 1 which consists of the steps a) and b).

* * * * *